United States Patent Office 3,109,910
Patented Nov. 5, 1963

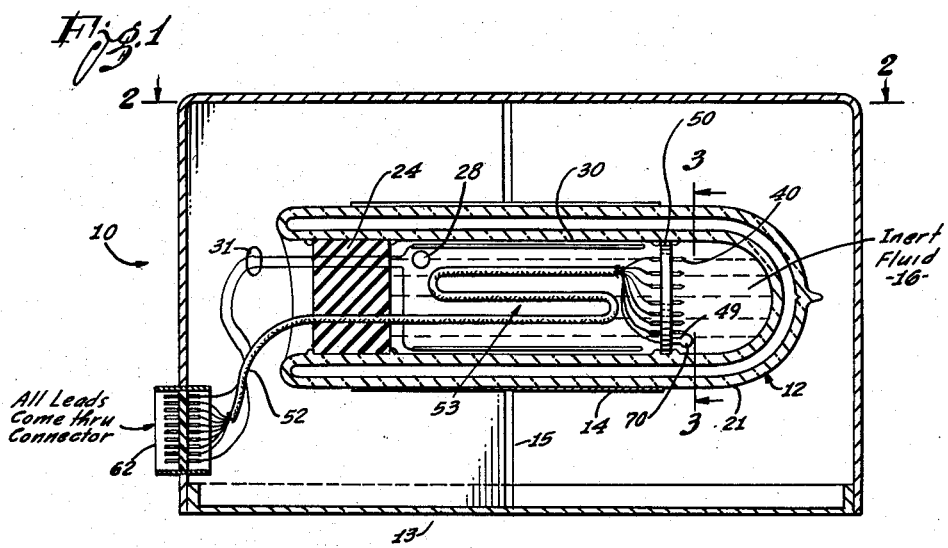
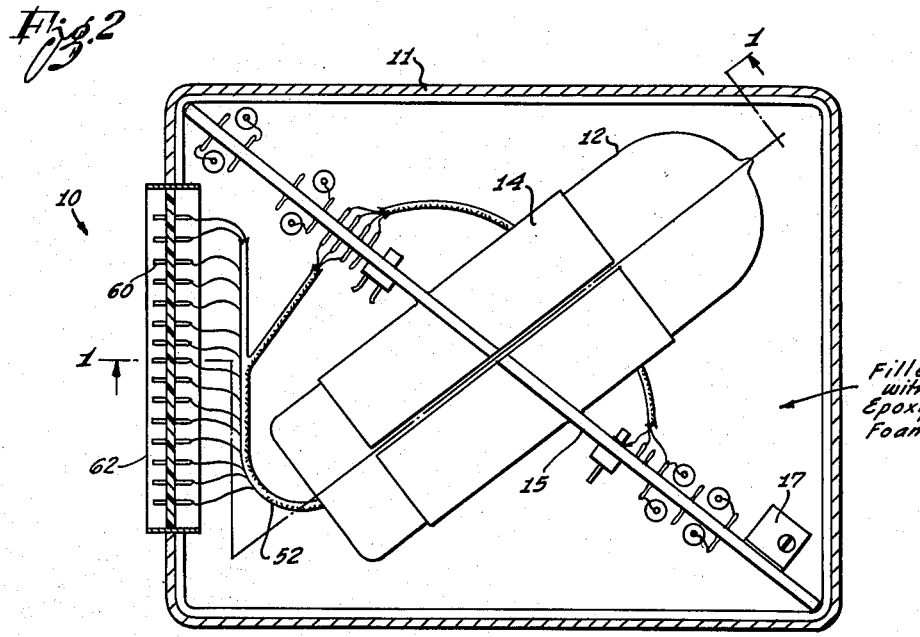
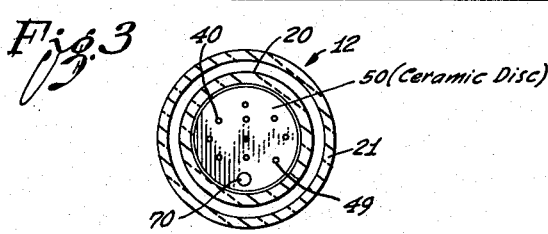

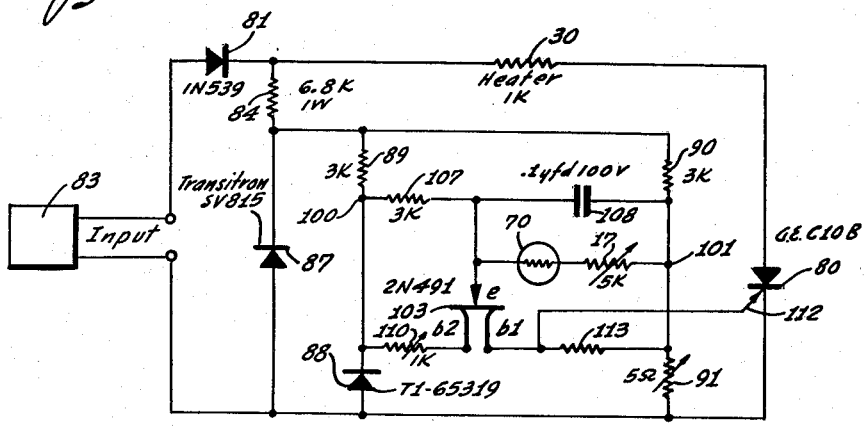
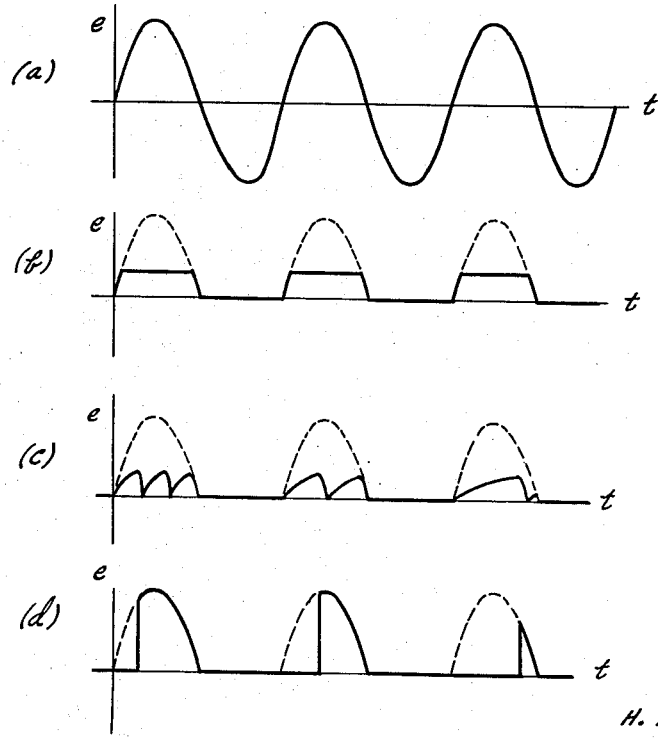

3,109,910
TEMPERATURE REFERENCE APPARATUS
Harry F. Fogleman, La Jolla, Calif., assignor to Genistron, Incorporated, Los Angeles, Calif., a corporation of California
Filed Aug. 29, 1960, Ser. No. 52,516
4 Claims. (Cl. 219—20)

This invention relates to apparatus for maintaining a constant temperature and, more particularly, to apparatus for providing reference temperature junctions for thermocouple temperature measuring systems.

Thermocouple temperature measuring systems are well known and operate by sensing the thermoelectric potential generated whenever two or more junctions of dissimilar metals are maintained at different temperatures. Changes in the temperature differential between the two or more junctions results in a thermoelectric potential between the junctions. In order to equate this temperature difference to an absolute temperature measurement, one of the junctions is maintained at a known reference temperature. Since the temperature difference is known by measuring the thermoelectric potential, the temperature at the other junction can then be determined.

At first, apparatus providing a reference temperature junction utilized ice baths for establishing the temperature of the reference junction. Subsequently, hot reference junctions have been utilized because it is generally easier to maintain a constant temperature over a period of time by adding heat than it is to remove it. Further, ice baths have additional difficulties such that they cannot be used in automatic systems. In a typical hot reference junction device, a large block of metal, which supports the reference junction, is heated to the reference temperature. However, due to thermal conduction, convection and radiation, the temperature at various positions of the block is different. Such devices are, accordingly, relatively accurate for only a single junction, even though devices of this type have been provided having a number of junctions positioned at different points of the block, where the points are theoretically of equal temperature in the temperature gradient through the block. There are many applications, however, in which a large number of temperature reference junctions at the same temperature, with accuracies exceeding that provided by these devices, are required. Utilizing the devices in which the junction is embedded in a metallic block, separate equipment is required which presents difficulties of insuring the same reference temperature in the different devices in addition to the considerable expense due to utilizing different devices.

Other disadvantages of prior devices, both cold and hot reference junctions, are that they are relatively bulky and are relatively inaccurate. For example, there are applications where temperature constancy within 0.1 of a degree centigrade is desirable with compact equipment, whereas temperature reference junctions have heretofore achieved stabilities only up to variations of 1 degree centigrade with such equipment.

In a specific illustrative embodiment of this invention, these disadvantages are overcome and accuracies more than ten times that achieved by prior devices are provided. In the illustrative embodiment, the apparatus has a volume less than one-quarter the volume of prior devices, and further, includes a relatively large number of temperature junctions instead of just one. These junctions are all maintained at the same reference temperature within variations of 0.1 degree centigrade.

Features of applicant's invention pertain to the provision of a uniform temperature field in which the reference junctions are located. The uniform temperature field is achieved utilizing a vacuum flask, illustratively of the type referred to as a Dewar flask. Means are included in the flask for providing the uniform temperature field. The means includes an inert fluid having a relatively high thermal conductivity, and a heater of particular dimensions and fabrication for introducing heat to the fluid.

The utilization of the flask reduces considerably the amount of heat dissipated from the inert fluid. The fluid, being inert, electrically insulates the thermocouple reference junctions, which are in the fluid, from each other. The seal of the flask is made of a compressible material which is not porous to the inert fluid in the flask and which has a low thermal conductivity. The various electrical leads to the junctions in the fluid and for the heater are provided through the seal to a thermo-loop trap in the fluid which insures that a thermal gradient is not established in the field in the vicinity of the reference junctions due to the wires in the flask. The flask is encapsulated in a suitable insulating material which provides further thermo-insulation. Features of this invention relate to the provision of solderless connections for the electrical leads extending from the flask to minimize the introduction of secondary temperature junctions in the system.

Further features of this invention relate to the provision of a stepless proportional control for introducing power to the heater for compensating the loss of heat from the inert fluid in the flask. The stepless proportional control is provided utilizing a switching element which is operated at a substantially constant frequency but with a duty cycle varying in accordance with the loss of heat from the flask. The switching element is connected to the heater and controls the power delivered to the heater. The control is stepless and proportional in that the heat is continuously being replaced at a constant frequency or repetition with the current to the heater during each cycle being in accordance with loss of heat from the inert fluid in the flask. The power to the heater varies in a stepless or analog manner for each pulse.

Further advantages and features of this invention will become apparent upon consideration of the following description when read in conjunction with the drawing wherein:

FIGURE 1 is a sectional view of the thermocouple reference junction apparatus of this invention taken along lines 1—1 of FIGURE 2 and illustrating the arrangement of the various components in the flask;

FIGURE 2 is a sectional view of the thermocouple reference junction apparatus of this invention taken along lines 2—2 of FIGURE 1;

FIGURE 3 is a sectional view through the flask utilized in the thermocouple reference junction apparatus of this invention taken along lines 3—3 of FIGURE 1;

FIGURE 4 is a circuit representation of the thermocouple reference junction apparatus of this invention; and FIGURE 5 is a series of curves illustrating the operation of the thermocouple reference junction of this invention.

Referring to FIGURES 1 through 3, the thermocouple reference junction apparatus 10 includes a can or container 11 which may be hermetically sealed and which may be made of a metal such as steel. All the components of the thermocouple reference junction apparatus 10 are included in the container 11. The container 11 may be quite small even though it includes means for providing a plurality of thermocouple reference temperature junctions. Illustratively, the dimensions of the container 11 may be 3¼ inches by 3⅛ inches by 2⅛ inches. A front panel 13 of the container 11 may be affixed to the rest of the container 11 after the various components have been assembled therein. A side wall of the container 11 supports a connector 62 which is hereinafter described. The connector 62 is utilized for electrically connecting the electrical components in the container 11 to external electrical circuitry. The electrical components in the container 11 are hereinafter described with particular reference to FIGURE 4.

The container 11 encloses a sealed flask 12 which may be of the type generally designated as a Dewar flask. The flask 12 is supported in a mounting tube 14 which is, in turn, supported by a mounting board 15. The mounting board 15 fits between opposite corners of the container 11 and may be affixed thereto by fastening means, not shown. The flask 12 is encapsulated in a low density insulating material which fills the rest of the container 11. The material may illustratively be an epoxy foam or a silicon foam or a polyurethene foam. These materials are lightweight and function as thermo insulators and also as cushioning means for reducing effects of shock and vibration. The foam material, accordingly, performs a number of functions in that it serves as a shock absorber and as a thermo insulator for increasing the stability of the thermocouple reference junction apparatus 10. In addition to foam material, other insulating materials such as an insulating oil or a rubber may be used. The board 15, in addition to supporting the flask 12 also supports a number of the various other electrical components forming the control circuit of this invention depicted in FIGURE 4.

As shown particularly in FIGURES 1 and 3, the flask 12 includes two walls 20 and 21 which may be made of a suitable material such as Pyrex. A vacuum is provided between the two walls 20 and 21 which functions as a thermo barrier preventing heat losses due to convection or conduction from the inside of the flask 12. The thickness of the Pyrex walls 20 and 21 may illustratively be 0.10 inch and both of the facing walls may be silvered to prevent radiation losses. The flask 12, in this manner, provides a thermo barrier reducing heat losses by radiation, convection and conduction.

The flask 12 is sealed by a flask seal 24 which is compressible, relatively non-porous and chemically inert with respect to a fluid 16, which is hereinafter described, in the flask 12. Illustratively, the seal 24 may be made of neoprene cork, or it may be made of silicon rubber or other suitable materials.

A uniform temperature field is provided in the flask 12 due to the presence of the inert fluid 16 and due to the particular heater 30 which is hereinafter described. The inert fluid 16 may either be a liquid or a gas which has a relatively high thermo conductivity as well as being chemically inert and an electrical insulator. Suitable liquids are silicon oils, polyisobutene, highly refined mineral oils, and Prestone (a type of esoglycol). Suitable inert gases are illustratively hydrogen, neon, krypton nitrogen and Freon. When an inert gas is utilized, the pressure in the flask 12 may be maintained at approximately 1¼ to 1½ times that of the atmospheric pressure at sea level. When an inert liquid is utilized instead of a gas, expansion room is provided and a suitable device, indicated at 28, may be utilized. Illustratively, the device 28 may be a rubber ball, or a metallic bellows, or balsa wood or other such devices to compensate for changes of the volume of the liquid due to temperature variations.

A heater 30 is also included in the flask 12 for introducing heat in a step-less continuous manner in accordance with the small amount of heat loss from the flask 12. A pair of leads 31 are connected to the heater 30 and pass through the seal 24. The heater 30 may have a cylindrical configuration, being fitted inside and adjacent the internal surface of the wall 20, to assist in maintaining the uniform temperature field in the fluid 16. More specifically, the heater may be made of helically wound wire of small diameter on a thin sheet of low specific heat material such as melamine glass. The low specific heat material does not require substantial amounts of heat or power. The glass support is flexible and the ends are wrapped around to form a cylindrical shape which expands against the inside wall of the flask when power is introduced. The cylindrical shape, the low specific heat support and the helical winding of small diameter wires are all features assisting in achieving the accurate uniformity of the thermal field in the flask. The winding material may be of the type designated Balco and manufactured by the Wilbur B. Driver Co., Newark, New Jersey. The winding has a positive resistance thermal coefficient so that more power is provided through the heater 30 when it is relatively cool. This feature assists in rapidly bringing the apparatus 10 up to temperature, and further provides for more sensitive adjustments due to the greater resistance of the heater 30 at the operating or reference temperature.

Also included in the flask 12 are a number of thermocouple reference junctions 40 through 49. These junctions are supported on a circular support member 50 adjacent one end of the interior of the flask 12, opposite to the seal 24. The member 50 may be made of an electrically insulating material such as a ceramic. The fluid 16 in the flask 12 electrically insulates the junctions 40 through 49 from one another. The particular number of junctions, is merely illustrative as it is apparent that either more or less than 10 junctions may be utilized. As shown in FIGURE 3, the junctions 40 through 49 may be arranged in a circle though, of course, they may also be arranged in accordance with any other configuration such as a rectangle. The junctions 40 through 49 may be made of a suitable material such as iron and constantin or Chromel and Alumel, or platinum and platinum rhodium.

A cable 52 passes through the seal 24 from the connector 62 to a thermo-loop trap 53 and therefrom to the ten junctions 40 through 49. The thermo-loop trap 53 consists of an S-shaped or other convoluted configuration to reduce the thermo-coupling through the cable from the exterior to the interior of the flask 12. Any long wire in the flask 12 functions as a thermo-loop trap. At the connector 62, the cable 52 is coupled to a number of contacts or pins 60 which may be gold plated. Solderless connections are utilized to the gold plated pins 60 by crimping the leads from the cable 52 thereto. By utilizing solderless connections, secondary reference junctions are minimized. Crimping provides a connection without the introduction of any additional alloy.

One other component is included in the flask 12, a thermistor 70, which functions as a temperature sensor. The thermistor 70 is connected by leads through the cable 53. Any other negative temperature component or material may be utilized instead of the thermistor. Providing the sensor 70 in the fluid 16 is an important feature of this invention in that the sensor is maintained at the same temperature as the reference junctions.

Referring now to FIGURE 4, which is a circuit representation of the control circuit including the thermistor 70, the heater 30 and a number of components supported on the board 15, a silicon controlled rectifier 80 has its anode connected in series with the heater 30 to the cathode of a diode 81. Alternating current power is applied from a source 83 between the anode of the diode 81 and the cathode of the rectifier 80. The alternating current voltage input may have a magnitude between 90 and 125 volts and a frequency between 30 and 1,000 cycles per second. The diode 81 rectifies the input to produce positive sine wave pulses in phase with the input voltages. The silicon control rectifier anode voltage is, accordingly, in phase with the input voltage. The input is illustrated as curve (a) in FIGURE 5, and the positive sine wave pulses are illustrated by the dash line in curve (b) also in FIGURE 5.

The positive half of each cycle of the alternating current supply voltage is impressed across a circuit arrangement including two Zener diodes 87 and 88. The Zener diode 88 is serially connected with a resistor 89 in a shunt relationship across a Zener diode 87. The potential across each of the diodes 87 and 88 is substantially constant during the application of most of the positive sine waves through the diode 81. The solid curve (b) in FIGURE 5 illustrates the clipped positive half cycles due to the operation of the Zener diode 87. The Zener potential of the diode 88 is smaller than that of the diode 87. Illustratively, the Zener potential of the diode 87 may be 18.5 volts and of the diode 88, 8.5 volts.

In addition to the shunting arrangement, including the diode 88 and the resistor 89, another shunting arrangement is provided across the Zener diode 87 including two series connected resistors 90 and 91. Because of the stable voltage across the Zener diodes 87 and 88, the junctions 100 and 101 respectively between the diode 88 and the resistor 89 and between the two resistors 90 and 91 are at a constant magnitude during most of the positive half cycles of the input alternating current. These voltages at the junctions 100 and 101 remain constant with large variations of the input voltage. As illustrated in FIGURE 4, the resistor 91 may be adjusted before the container is sealed to compensate for any small variation of Zener potential at different input voltages.

A timing circuit is coupled between the two junctions 100 and 101 which includes a uni-junction transistor 103 and the thermistor 70, which was mentioned above. The thermistor 70 is serially connected with a rheostat 17 between the emitter e of the uni-junction transistor 103 and the junction 101. The emitter e is also connected by a resistor 107 to the junction 100, and by a capacitor 108 to the junction 101. The capacitor 108 and the shunting circuit, including the thermistor 70 and the rheostat 17, determine the instant the uni-junction transistor 103 becomes conductive.

When the transistor 103 is non-conductive, a high impedance is presented between its junctions. The base electrode B2 of the transistor is connected by a resistor 110 to the junction 100 and the base electrode B1 is connected to the control or gate lead 112 of the silicon controlled rectifier 80. As illustrated in FIGURE 4, the resistor 110 may be adjustable. The adjustment is made before sealing the container at the factory for temperature compensation of the uni-junction transistor 103. The base electrode B1 is also connected by a resistor 113 to the junction 101 between the resistors 90 and 91. The silicon controlled rectifier 80 normally presents a high impedance in series with the heater 30 but when a positive potential of suitable magnitude is introduced to its control lead 112, it switches to a low impedance condition providing current through the heater 30. The duration that the rectifier 80 is in its low impedance condition and, therefore, the duration that power is provided to the heater 30 is determined by the duration that the uni-junction transistor 113 is first conductive during each cycle of the input voltage from the input source 83. Once the rectifier 80 becomes conductive, it remains conductive as long as adequate anode potential is provided thereto even though the gate potential is removed. In other words, if the transistor 103 returns to its high impedance condition, the rectifier 80 remains conductive. The time that the uni-junction transistor 103 is first conductive is determined by the resistance presented by the capacitor shunting arrangement including the serially connected thermistor 70 and rheostat 17. This circuit arrangement varies the amount of available charging current to the capacitor 108. The thermistor 70 is a negative resistance temperature sensor which reduces the impedance across the capacitor 108 as the temperature increases.

The setting of the rheostat 17 determines the reference temperature of the uniform temperature field in the flask 12. At the beginning of each positive half cycle, the positive sinusoidal pulse is applied at the anode of the rectifier 80 but the potential at the gate lead 112 increases to a positive value determined by the potential at the junction 101. The uni-junction transistor 103 is not conductive at this time, presenting an impedance of several kilohms. The potential at the junction 101 and, accordingly, at the gate lead 112 is insufficient to fire the rectifier 80 so that it maintains its high impedance condition as long as the uni-junction transistor 103 is non-conductive or also at its high impedance condition.

The uni-junction transistor 103 becomes conductive when its emitter e becomes positive with respect to its base B1 by a predetermined small amount. The potential at the junction 100 is more positive than at the junction 101 and the capacitor 108 begins to charge as soon as the positive half cycle is initiated. The capacitor 108 and its shunting circuit function as a timing circuit to determine the instant that the emitter e becomes sufficiently positive to cause the transistor 103 to become conductive. The smaller the shunting resistance presented by the serially connected thermistor 70 and rheostat 17, the longer the delay for operating the transistor 103.

The higher the temperature of the fluid 16 in the flask 12, the smaller the resistance presented by the thermistor 70. If the temperature of the fluid 16 exceeds the operating temperature, the shunting resistance is sufficiently low so that the capacitor 108 does not sufficiently charge to the conducting potential of the uni-junction transistor 103. At temperatures below the desired reference temperature, the uni-junction transistor 103 first becomes conductive at a time position in each positive half cycle determined by the differential between the actual temperature and the desired reference temperature.

When the transistor 103 becomes conductive, it rapidly discharges the capacitor to lower the potential at its emitter e. When the transistor 103 becomes conductive, it provides a relatively large pulse to the gate 112 to cause the rectifier 80 to become conductive. The reduction of emitter potential causes the transistor 103 to return to its non-conductive condition. The rectifier 80, however, remains conductive once fired by the potential at the gate lead 112. When the transistor 103 becomes non-conductive, the capacitor 108 again starts to recharge. The timing circuit, including the capacitor 108 and the transistor 103, accordingly, cyclically operate. The operation of the timing circuit after the first conduction of the transistor 103 during each positive half cycle of the input potential, does not affect the conductivity of the rectifier 80 and, accordingly, it does not affect the amount of power delivered to the heater 30. The frequency of the timing circuit is controlled by the shunting resistance including the thermistor 70.

As illustrated in FIGURE 5, curve c, the potential across the capacitor 108 varies in a sawtooth manner with the frequency decreasing for successive half cycles of the input signal as the operating reference temperature is approached. As shown in curve (d) of FIGURE 5, the silicon controlled recetifier 80 is fired later and later during each cycle as the temperature in the flask 12 approaches the desired operating temperature. When the apparatus 10 is first energized, or when the reference temperature is first approached, there may be an initial overshoot. When the operating temperature is exceeded, the control rectifier 80 is no longer conducting. As the temperature recedes from the initial overshoot, the uni-junction transistor 103 will again supply a pulse to the control lead 112, proportional in phase relationship with the anode potential to the temperature error or difference. Thereafter, successive pulses of power will be delivered to the heater 30 just sufficient to overcome the loss of heat from the flask 12.

Stepless proportional control is, in this manner, achieved with successive pulses being provided, each having a duration sufficient to overcome the energy loss. The duration of the pulses vary in successive cycles of the input voltage in an analog or stepless manner. In other words, any duration in a range of durations may be provided. If the environmental conditions alter the transfer of energy from the flask 12, an immediate and appropriate change of the power to the heater 30 takes place to maintain a constant and precise reference temperature.

After the initial overshoot, the temperature of the fluid 16 generally does not exceed the desired reference temperature so that the pulses to the heater 30 are uninterrupted. The ambient temperature may illustratively be any temperature less than 75 degrees centigrade, and the reference temperature may illustratively be 100 degrees centigrade. A predetermined minimum temperature differential between reference and ambient temperatures is required for satisfactory operation. Illustratively, as indicated above, this differential may be 25 degrees centigrade.

The following is a list of illustrative magnitudes and identifications of electrical components which can be utilized in the apparatus of this invention:

| | |
|---|---|
| Diode 81 | 1N539. |
| Resistor 84 | 6.8 kilohms. |
| Diode 87 | Transistron SV815. |
| Diode 88 | Texas Instrument 653C9. |
| Resistor 89 | 3 kilohms. |
| Resistor 107 | 3 kilohms. |
| Heater 30 | 1 kilohm cold, 1.45 kilohms hot. |
| Capacitor 108 | .1 microfarad. |
| Resistor 90 | 3 kilohms. |
| Rheostat 17 | 5 kilohms. |
| Thermistor 70 | 20 kilohms (cold—25° C.). |
| Transistor 103 | 2N91. |
| Rectifier 80 | G.E. C10B. |
| Resistor 110 | ~1 kilohm. |
| Resistor 113 | 330 ohms. |
| Resistor 91 | ~5 ohms. |

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:
1. In combination, a substantially thermally insulated enclosure, a temperature sensor in said enclosure for sensing variations in temperature in said enclosure, a heater for introducing heat to said enclosure, and circuit means coupled to said sensor through said enclosure and to said heater for providing pulses to said heater at a constant frequency and at a duty cycle controlled by said sensor, said circuit means including a switching element serially connected with said heater, said switching element having a normal high impedance condition, and an operative low impedance condition, a source of unidirectional sinusoidal pulses of current connected to the serially connected heater and switching element, and a timing circuit including said sensor coupled to said source and to said element for determining the duration of operation of said element during each pulse of current from said source in accordance with temperature sensed by said sensor.

2. A control circuit, including, an output element to which power is to be supplied; a switching element serially connected with said output element having a normal high impedance condition in which power is not supplied to said output element, and an operative low impedance condition during which power is supplied to said output element; a source of alternating current connected to the serially connected output element and switching element; and a capacitive timing circuit arrangement coupled between said source and said switching element, said arrangement including a capacitor connected to said source for controlling the duration of operation of said switching element during each cycle of the alternating current, and a resistive element having a negative temperature coefficient of resistance coupled across said capacitor whereby the duty cycle of operation of said switching element varies with changes of temperature.

3. In combination, a substantially thermally insulated enclosure, a temperature sensor in said enclosure for sensing variations in temperature in said enclosure, a heater for introducing heat to said enclosure, and circuit means coupled to said sensor through said enclosure and to said heater for providing pulses to said heater at a constant frequency and at a duty cycle controlled by said sensor, said circuit means including a switching element serially connected with said heater, said switching element having a normal high impedance condition, and an operative low impedance condition, a source of unidirectional sinusoidal pulses of current connected to the serially connected heater and switching element, and a timing circuit including said sensor coupled to said source and to said element for determining the duration of operation of said element during each pulse of current from said source in accordance with temperature sensed by said sensor, and said timing circuit also including a capacitor shunting said sensors for varying the frequency of said timing circuit in accordance with the impedance of said sensor, and a unijunction transistor coupled between said capacitor and said switching element for controlling the initiation of operation of said switching element.

4. Thermocouple reference junction apparatus, including:
   a vacuum flask for providing the thermal barrier,
   an inert fluid in said flask for providing a continuous thermal field throughout said flask,
   a heater disposed in said flask in heat-exchanging relation with said fluid or introducing heat to the inert fluid,
   a control circuit coupled to said heater for controlling the amount of heat introduced to the inert fluid,
   a plurality of reference thermocouple junctions in the inert fluid of said flask, said control circuit including a temperature sensor in the inert fluid in said flask,
   circuit means including a switch element having a normal high impedance condition and an operative low impedance condition for successively and continuously introducing electrical pulses to said heater to compensate for the heat loss from the inert fluid, and
   means coupled to said switching element and including said temperature sensor for operating said switching elements at a predetermined substantially constant frequency for intervals related to the amount of heat loss from said inert fluid as determined by said sensor.

References Cited in the file of this patent
UNITED STATES PATENTS

| | | |
|---|---|---|
| 2,762,895 | Throw | Sept. 11, 1956 |
| 2,858,407 | Hykes | Oct. 28, 1958 |
| 2,864,978 | Frank | Dec. 16, 1958 |
| 2,935,677 | Lemmerman et al. | May 3, 1960 |
| 2,975,260 | Carlson | Mar. 14, 1961 |
| 3,028,473 | Dyer et al. | Apr. 3, 1962 |